US010710247B2

(12) United States Patent
Kirkwood et al.

(10) Patent No.: US 10,710,247 B2
(45) Date of Patent: Jul. 14, 2020

(54) GRIPPER DEVICES

(71) Applicant: SRI INTERNATIONAL, Menlo Park, CA (US)

(72) Inventors: Gordon Kirkwood, Atherton, CA (US); Murphy Kitchell, Mountain View, CA (US)

(73) Assignee: SRI International, Menlo Park, CA (US)

( * ) Notice: Subject to any disclaimer, the term of this patent is extended or adjusted under 35 U.S.C. 154(b) by 0 days.

(21) Appl. No.: 16/184,053

(22) Filed: Nov. 8, 2018

(65) Prior Publication Data

US 2020/0147812 A1 May 14, 2020

(51) Int. Cl.
*B25J 15/00* (2006.01)
*B25J 19/00* (2006.01)

(52) U.S. Cl.
CPC ....... *B25J 15/0071* (2013.01); *B25J 19/0058* (2013.01)

(58) Field of Classification Search
CPC .......................... B25J 19/0058; B25J 15/0071
See application file for complete search history.

(56) References Cited

U.S. PATENT DOCUMENTS

| 3,866,966 | A | * | 2/1975 | Skinner, II | ............... | A61F 2/588 |
| | | | | | | 294/106 |
| 3,901,547 | A | * | 8/1975 | Skinner, II | ............. | B25J 15/103 |
| | | | | | | 294/195 |
| 4,653,793 | A | * | 3/1987 | Guinot | ................... | B25J 13/082 |
| | | | | | | 294/106 |
| 5,080,682 | A | * | 1/1992 | Schectman | ............. | A61F 2/583 |
| | | | | | | 294/111 |
| 8,910,985 | B2 | * | 12/2014 | Neeper | ................... | B25J 9/102 |
| | | | | | | 294/119.1 |
| 2007/0135813 | A1 | * | 6/2007 | Yamamoto | ......... | A61B 18/1445 |
| | | | | | | 606/46 |

OTHER PUBLICATIONS

Needle Grippers, Schmalz, accessed on Aug. 1, 2018, https://www.schmalz.com/en/vacuum-technology-for-automation/vacuum-components/special-grippers/needle-grippers.

* cited by examiner

*Primary Examiner* — Stephen A Vu
(74) *Attorney, Agent, or Firm* — McDonnell Boehnen Hulbert & Berghoff LLP

(57) ABSTRACT

Systems are provided for gripping or otherwise manipulating lettuce, sliced foodstuffs (e.g., sliced cheese, sliced tomato or other sliced vegetables), or other foodstuffs or other irregular objects or substances. These systems can facilitate the manipulation of groups of irregular objects, including distributing small amounts (e.g., individual instances) of such groups of objects. These systems operate to manipulate such objects by extending and retracting rods, wires, or otherwise-configured pins to contact and/or penetrate the object(s) to be manipulated. In some examples, the pins are retracted to individually dispense objects (e.g., slices of cheese) from a stack of objects. In some examples, the separation and angle of the pins can be controlled to, e.g., grip one or more irregular objects and subsequently to dispense some or all of the gripped object(s).

21 Claims, 8 Drawing Sheets

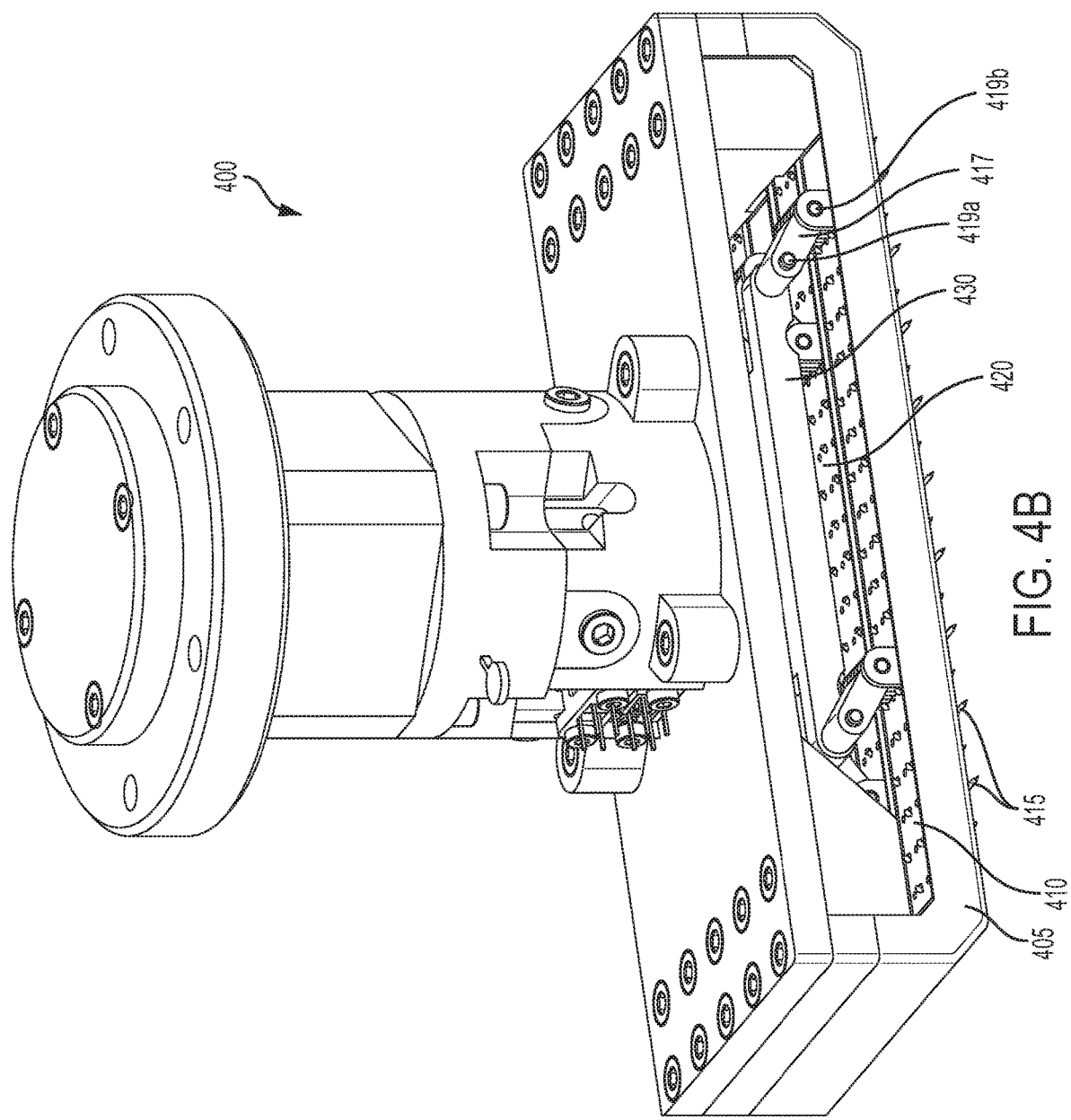

GRIPPER DEVICES

BACKGROUND

Unless otherwise indicated herein, the materials described in this section are not prior art to the claims in this application and are not admitted to be prior art by inclusion in this section.

A variety of grippers are available to facilitate the manipulation of a variety of objects or substances, e.g., mechanical components, electronic components, sheets or metal or other material, planks of wood or lumber, textiles, or other substances. Such grippers may be adapted to the material/object to be manipulated. For example, where the objects to be manipulated have smooth, non-permeable surfaces, a gripper may employ suction to manipulate the objects. Where the object is a manufactured object, the gripper may include elements configured to interface with a particular feature(s) of the manufactured object (e.g., a hard point, handle, or other feature formed to facilitate gripping).

SUMMARY

Some embodiments of the present disclosure provide a gripper apparatus including: (i) a first iris, wherein the first iris includes a first static plate having a first plurality of openings therein and a first rotatable plate having a second plurality of openings therein, wherein the first rotatable plate has a first axis of rotation, and wherein the first rotatable plate is rotatable, relative to the first static plate, about the first axis of rotation; (ii) a second static plate having a third plurality of openings therein; (iii) a push plate that is slidably movable relative to first iris and the second static plate; and (iv) a plurality of flexible wires. Each respective wire of the plurality of wires (e.g., flexible wires, rigid wire) is disposed within a respective opening of the first plurality of openings, a respective opening of the second plurality of openings, and a respective opening of the third plurality of openings such that rotation of the first rotatable plate relative to the first static plate results in a change in a distance between the respective wire and the first axis of rotation of the first rotatable plate. Each wire of the plurality of flexible wires is mechanically coupled to the push plate such that motion of the push plate, relative to the first iris and the second static plate, results in longitudinal motion of the plurality of wires through the first, second, and third pluralities of openings.

Some embodiments of the present disclosure provide a gripper apparatus including: (i) a first push plate, wherein a first plurality of pins are coupled to the first push plate, and wherein the pins of the plurality of first pins are substantially parallel to each other; (ii) a second push plate, wherein a second plurality of pins are coupled to the second push plate, wherein the pins of the plurality of second pins are substantially parallel to each other, and wherein pins of the first plurality of pins are substantially non-parallel to pins of the second plurality of pins; and (iii) a guide plate having a contact surface. The guide plate has formed therein a first plurality of channels extending from the contact surface and a second plurality of channels extending from the contact surface. The first push plate is disposed relative to the guide plate such that the pins of the first plurality of pins are disposed within respective channels of the first plurality of channels. The second push plate is disposed relative to the guide plate such that the pins of the second plurality of pins are disposed within respective channels of the second plurality of channels. The first push plate and the second push plate are slidably movable relative to the guide plate such that the first push plate and the second push plate can be moved relative to the guide plate to result in the first plurality of pins and second plurality of pins, respectively, protruding from the contact surface.

Some embodiments of the present disclosure provide a method for gripping individual items in a stack of items, the method that includes positioning a gripper apparatus proximate to a stack comprising a plurality of items in a stacked arrangement. The gripper apparatus includes: (i) a first push plate, wherein a first plurality of pins are coupled to the first push plate, and wherein the pins of the plurality of first pins are substantially parallel to each other; (ii) a second push plate, wherein a second plurality of pins are coupled to the second push plate, wherein the pins of the plurality of second pins are substantially parallel to each other, and wherein pins of the first plurality of pins are substantially non-parallel to pins of the second plurality of pins; and (iii) a guide plate having a contact surface. The guide plate has formed therein a first plurality of channels extending from the contact surface and a second plurality of channels extending from the contact surface. The first push plate is disposed relative to the guide plate such that the pins of the first plurality of pins are disposed within respective channels of the first plurality of channels. The second push plate is disposed relative to the guide plate such that the pins of the second plurality of pins are disposed within respective channels of the second plurality of channels. The first push plate and the second push plate are slidably movable relative to the guide plate such that the first push plate and the second push plate can be moved relative to the guide plate to result in the first plurality of pins and second plurality of pins, respectively, protruding from the contact surface. The method additionally includes: actuating the first push plate and the second push plate of the gripper apparatus such that the first plurality of pins and the second plurality of pins protrude from the contact surface and penetrate at least a portion of the stack; moving the gripper apparatus to a first location; actuating the first push plate and the second push plate of the gripper apparatus to partially retract the first plurality of pins and the second plurality of pins into the guide plate such that a first item in the stack is dispensed at the first location; moving the gripper apparatus to a second location; and actuating the first push plate and the second push plate of the gripper apparatus to further retract the first plurality of pins and the second plurality of pins into the guide plate such that a second item in the stack is dispensed at the second location.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

FIG. 4B is a side view of elements of the example gripper of FIG. 4A.

DETAILED DESCRIPTION

Figure 1:
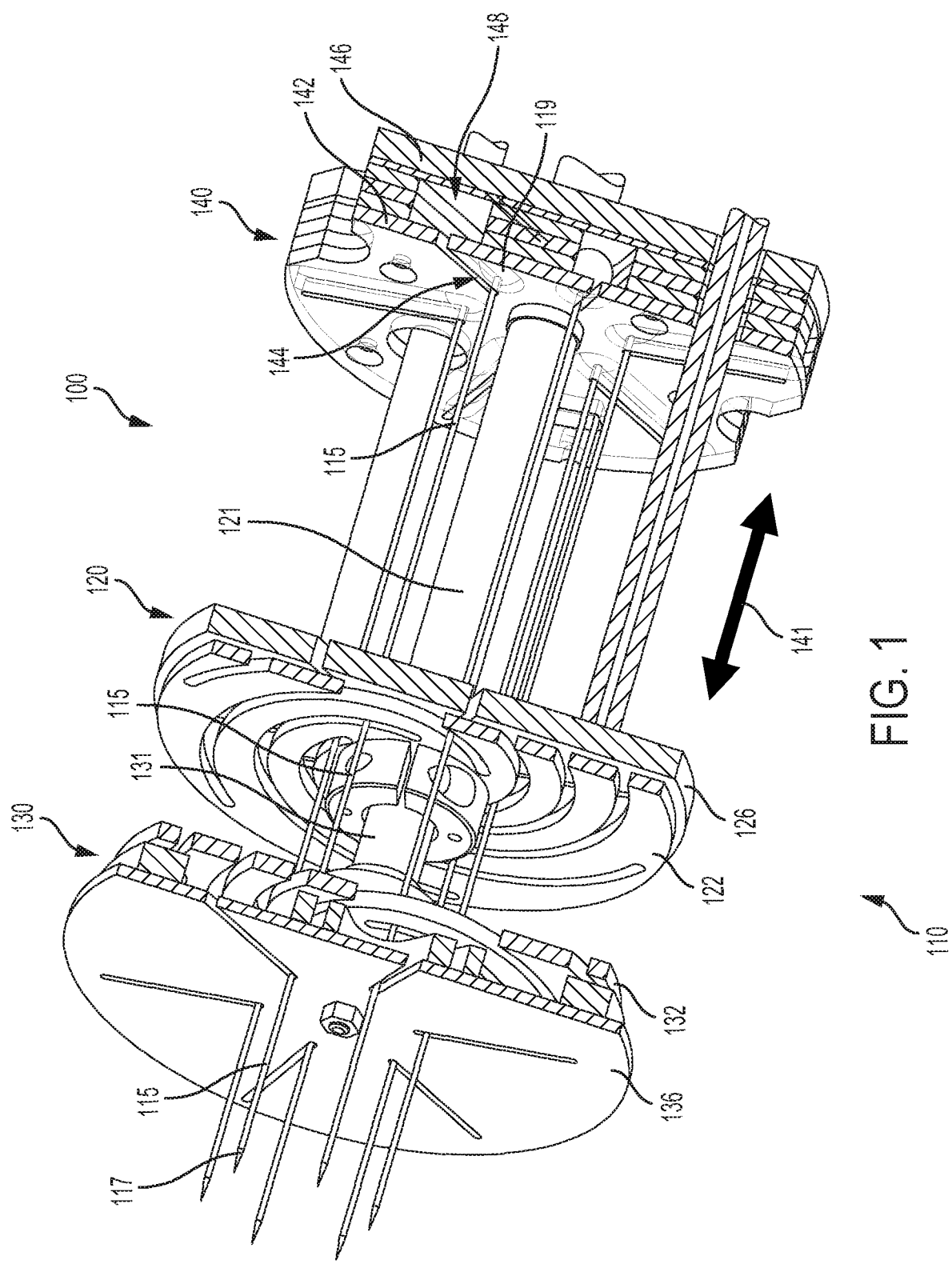
FIG. 1 is a perspective view of an example gripper.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

I. Overview

A variety of materials can be difficult to manipulate by artificial means due to slipperiness, stickiness, frangibility, being composed of individual slices or sheets (e.g., sliced cheese, leaves of lettuce or other vegetables, slices of meat, slices of tomato), being composed of a plurality of irregularly-shaped objects (e.g., nuts, berries, small tomatoes, cubed meats or cheeses), being irregularly shaped, being especially compliant and/or being susceptible to plastic deformation, or other reasons. Such materials can include a variety of foodstuffs, making automation of food processing or food preparation difficult.

The present disclosure provides a variety of mechanical grippers or other apparatus adapted to effectively manipulate such materials. These embodiments include sets of pins or wires configured to penetrate, enclose, or otherwise manipulate materials. In some embodiments, sets of parallel pins extend from a contact surface to penetrate material to be manipulated. Subsequently, the pins can be retracted to release or otherwise dispense the material. In examples wherein the penetrated material is a stack of slices of material (e.g., a stack of slices of cheese), the degree of retraction can be controlled to dispense individual slices of the material at a time.

In some embodiments, a gripper includes an enclosing arrangement of wires. The extension of the wires from the gripper, the distance from a center point from which the wires protrude from the gripper, and the angle of the wires relative to a surface of the gripper, a central axis of the array of wires, or to some other structure(s) of the gripper can all be controlled in order to manipulate materials. In some examples, the wires can be extended to penetrate the materials and/or retracted to release or eject such materials. Additionally or alternatively, the gripper can be operated to grasp the material (e.g., to grasp a plurality of irregularly-shaped objects) by, e.g., changing an angle of the wires and/or reducing an effective radius at which the wires protrude from the gripper, thus enclosing and gripping the material. The material can then be dispensed in a controlled manner, e.g., by changing the angle of the wires, by increasing the effective radius at which the wires protrude from the gripper, and/or by retracting the wires into the gripper. In some examples, the gripper includes one or more actuated irises through which the wires protrude such that rotation of the iris changes an effective radius at which the wires protrude through the iris.

II. Example Iris-Type Grippers

In some embodiments, a gripper may be configured to control the orientation and position of a set of wires or rods in order to grip, pierce, scoop, pinch, dispense, release, compactify, or otherwise manipulate foodstuffs or other materials of interest. The ability to control the angle of such wires and/or the effective radius at which the wires protrude from a gripper allows for foodstuffs or other irregular objects to be manipulated in a wide variety of ways, facilitating flexible strategies for the manipulation of the materials of interest.

An example of such a gripper is illustrated in FIG. 1. The gripper 100 includes a number of wires 110 (including example wire 115). The gripper 100 is configured to manipulate materials (e.g., foodstuffs, other irregular objects) by controlling the angle of the wires 110, the length of the wires 110 that protrudes from the gripper, and/or an effective radius at which the wires 110 protrude from the gripper 100. The gripper 100 includes a first iris 120, a second iris 130, and a push plate 140 that are configured to facilitate control of the orientation and position of the wires 110. The wires 110 can include tips (including an example tip 117 that is coupled to the end of the example wire 115) that may be pointed (e.g., sharpened), rounded, scoop-shaped, formed to have an edge or blade, or shaped in some other manner to facilitate manipulation of a foodstuff or other material of interest. For example, the tips could be pointed in order to facilitate the gripper 100 penetrating the material (e.g., slices of tomato) with the wires 110.

In order to control the location and angle of the wires 110, the first iris 120, second iris 130, and push plate 140 may be actuated. The push plate 140 can control the distance that the wires 110 protrude from the gripper 100 (by moving along a sliding direction 141) and the irises 120, 130 can control the angle of the wires 110 and the locations at which the wires 110 protrude from the gripper 100.

Figure 2A:
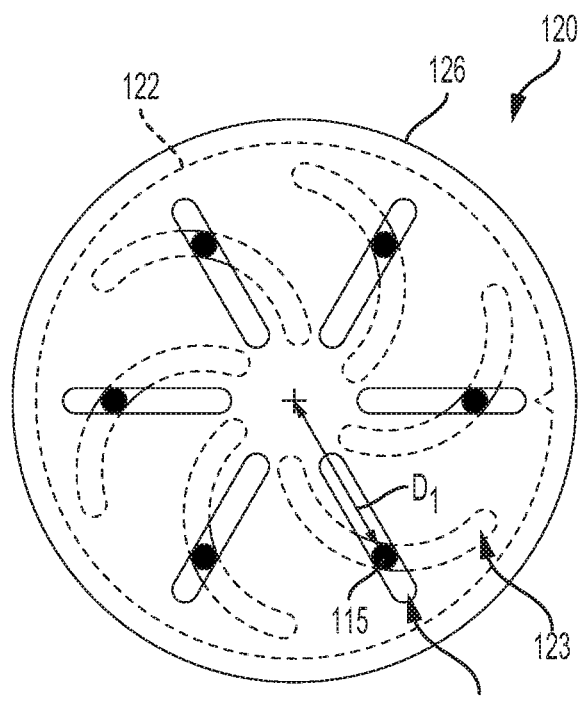
FIG. 2A is a cross-sectional view of elements of an example gripper.
Figure 2B:
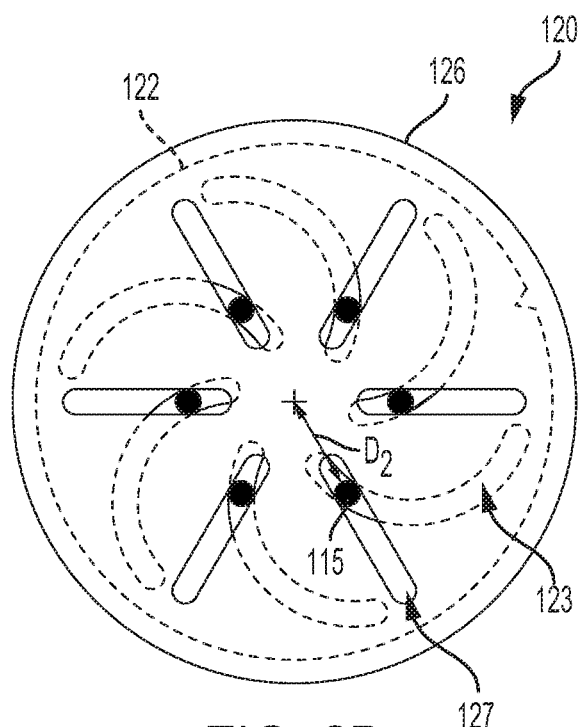
FIG. 2B is a cross-sectional view of elements of the example gripper of FIG. 2A.

FIGS. 2A and 2B illustrate how the irises 120, 130 can be operated to effect this control. FIGS. 2A and 2B show a static plate 126 and a rotatable plate 122 of an iris 120 at respective first and second points in time. The rotatable plate 122 is able to rotate, relative to the static plate 126, about an axis of rotation (indicated by the "+" symbol). A plurality of wires (including an example wire 115), shown in cross-section, pass through the iris 120. The static plate 126 and rotatable plate 122 include respective sets of openings (including first example opening 127 in the static plate 126 and second example opening 123 in the rotatable plate 122) through which the wires pass (e.g., the example wire 115 is disposed within the first 127 and second 123 openings).

The regions where the openings in the static plate 126 overlap with the openings in the rotatable plate 122 define regions where the wires can pass through the iris 120. Accordingly, rotation of the rotatable plate 122 relative to the static plate 126 can cause the location of the wires to change by changing the locations at which the sets of openings overlap. For example, the location of the rotatable plate 122 relative to the static plate 126 at the first point in time (illustrated in FIG. 2A) results in the first 127 and second 123 example openings overlapping at a first location such that the example wire 115 is separated from the axis of rotation of the rotatable plate 122 by a first distance "$D_1$." Subsequently, the rotatable plate 122 may be rotated relative to the static plate 126 such that the location of the wires is changed. For example, the rotatable plate 122 could be rotated counter-clockwise, as shown in FIG. 2B, such that the example wire 115 moves in a radial direction and becomes separated from the axis of rotation of the rotatable plate 122 by a second distance, "$D_2$," that is less than "$D_1$."

As shown in FIGS. 2A and 2B, the openings in the static plate 126 take the form of linear slots and the openings in the rotatable plate 122 take the form of spiral slots. However, this is intended as a non-limiting example embodiment, and other configurations of openings are anticipated. For example, the static plate could have spiral openings and the rotatable plate could have linear slot openings. Both plates could have spiral openings, or openings having some other geometry (e.g., an asymmetric geometry), in order to allow the location of the wires to be controlled both radially and circumferentially, to reduce the likelihood that the wires become jammed between the plates 126, 122, to reduce a torque needed to rotate the rotatable plate 122 relative to the static plate 126, to balance the amount of torque needed to rotate the rotatable plate 122 relative to the static plate 126 across a range of relative positions of the plates 126, 122, or to provide some other benefit.

Additionally, while the irises disclosed herein are described as including "static" plates and "rotatable" plates, these descriptors are only intended for ease of description. While the rotatable plates are rotatable relative to respective static plates, the static plates may also be capable of rotation. For example, the "static plate" and the "rotatable plate" may each be independently rotatable, e.g., to permit both the radial distance and the angle, relative to the axes of rotation of the plates, at which the wires pass through the iris to be independently controlled.

The first 120 and second 130 irises contain respective first 122 and second 132 rotatable plates and respective first 126 and second 136 static plates, with the rotatable plates being rotatable about a central, common axis of rotation relative to the static plates. The first 122 and second 132 rotatable plates are coupled to respective first 121 and second 131 drive members, allowing motors or other actuators (not shown) to drive the rotation of the first 122 and second 132 rotatable plates. As shown, the first drive member 121 has the form of a tube and the second drive member 131 has the form of a rod that is disposed within the first drive member 121. This allows the irises 120, 130 to be driven coaxially, potentially reducing the size and complexity of the gripper 100. The irises 120, 130 could be driven via alternative means, e.g., by motors disposed proximate to the rotatable plates 132, 122 and coupled thereto by, e.g., respective spur gears.

The first 122 and second 132 rotatable plates can be rotated in order to control the distance, from the common axis of rotation, at which the wires 110 pass through the first 120 and second 130 irises. The push plate 140 can increase or decrease the length of the portion of the wires that extends beyond the static plate 136. The combination of the rotation of the first and second rotatable plates 122 and 123 and the axial movement of the wires 110 allows the distance of the wires from the central axis of rotation to be controlled at two different planes along the length of the gripper 100 (i.e., at planes corresponding to the locations of the irises 120, 130 along the length of the gripper), thus facilitating independent control of the angle of the wires 110 as well as the distance, from the axis of rotation, at which the wires 110 protrude from the gripper 110 (e.g., from the static plate 136 of the second iris 130 or from some other element of the gripper 100 (not shown).

The wires 110 are coupled to the push plate 140 such that motion of the push plate 140, along the axis of the gripper 100 (the direction indicated by arrow 141), results in a change in the distance by which the wires 110 protrude from the gripper 100. In the example illustrated in FIG. 1, the wires 110 are coupled to the push plate 140 by being coupled to respective spheres (including an example sphere 119 that is coupled to the example wire 117) that are kept captive within respective channels within the push plate 140. This is illustrated by the example wire 117 being coupled to the example sphere 119 by passing through a linear slot 144 formed in a forward plate 142 of the push plate 140. The example sphere 119 is kept between the forward plate 142 and a reverse plate 146 of the push plate 140 in a channel 148 that is formed within the push plate 140. Thus, the end of the example wire 117 that is coupled to the example sphere 119 is maintained at a specified distance along the axis of the gripper 100, the specified distance corresponding to the location of the push plate 140 along the length of the gripper 100, while being able to move freely along a radial direction relative to the axis of the gripper 100. Alternative methods of coupling wires to a push plate are also contemplated, e.g., direct coupling of an end of a wire to the push plate (relying on flexibility of the wire to permit the wire to deform along its length to pass through one or more irises), coupling via a hinge or pin, or some other form of coupling.

The use of two irises and a push plate to control wires of a gripper is illustrated in FIGS. 3A-D. FIGS. 3A-D illustrate, in cross-section, elements of a gripper 300 as described herein (e.g., gripper 100) at respective different points in time. The gripper 300 includes a first iris that includes a first static plate 310b and a first rotatable plate 310a, a second iris that includes a second static plate 320b and a second rotatable plate 320a, and a push plate 340. The wire passes through respective openings in the plates of the first and second irises and is coupled to the push plate 340 via a sphere 335 that is held captive within a channel of the push plate 340. The first rotatable plate 310a is driven by a rod 315 that is disposed within a tube 325 used to drive the second rotatable plate 320a.

Figure 3A:
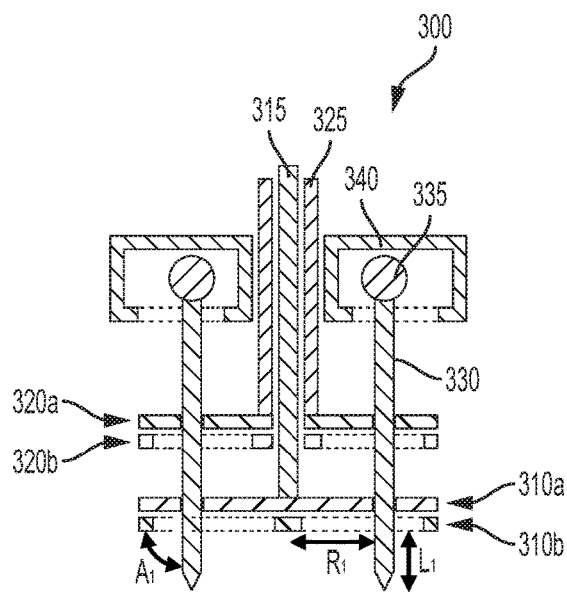
FIG. 3A is a cross-sectional view of elements of an example gripper.

FIG. 3A illustrates the configuration of the gripper 300 at a first point in time, when the wires 330 are substantially parallel and at angle "$A_1$" relative to the gripper 300, protrude from the gripper by a first length "L1," and protrude from the gripper 300 at a first radial distance "$R_1$" from the common axis of rotation of the rotatable plates 310a, 320a. The irises 310, 320 and push plate 340 can be operated to control each of these degrees of freedom (i.e., the angle, length of protrusion, and radius of protrusion) individually and/or in combination.

Figure 3B:
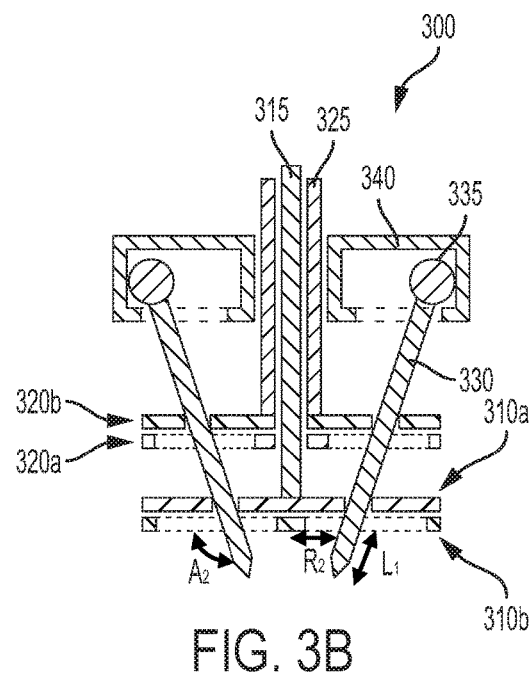
FIG. 3B is a cross-sectional view of elements of the example gripper of FIG. 3A.
Figure 3C:
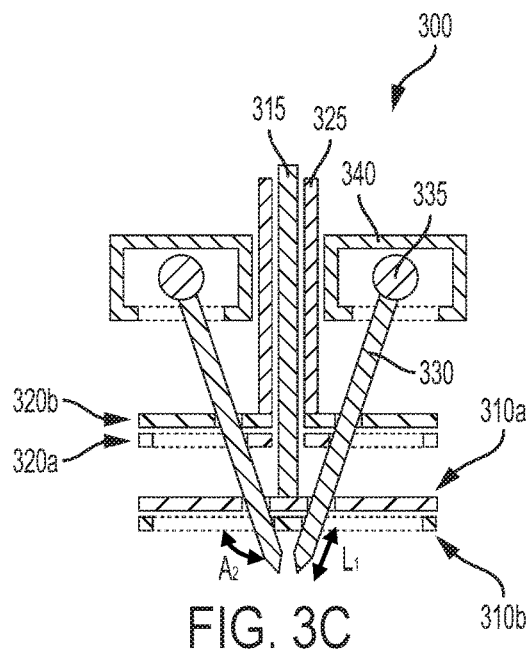
FIG. 3C is a cross-sectional view of elements of the example gripper of FIG. 3B.
Figure 3D:
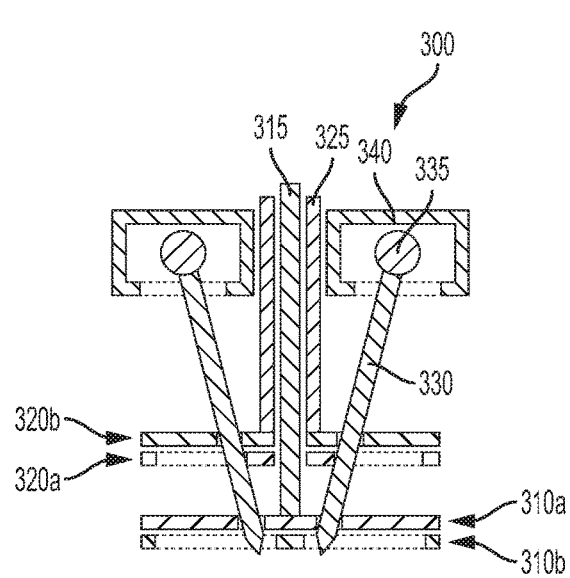
FIG. 3D is a cross-sectional view of elements of the example gripper of FIG. 3C.

For example, the first rotatable plate 310a of the first iris could be rotated to reduce the radial distance at which the wires 330 protrude from the gripper 300 as well as to change the angle of protrusion. This is illustrated in FIG. 3B, where the radial distance of protrusion of the wires 330 has been reduced to "$R_3$" and the angle of the wires 330 has increased to "$A_2$" while the wires 330 protrude from the gripper by the same distance "$L_1$" as in FIG. 3A. In another example, multiple aspects of the gripper 300 could be controlled at the same time, e.g., to enable independent control of one of the degrees of freedom of the wires while keeping the other degrees of freedom substantially static. This is illustrated in FIG. 3C, where the radial distance of protrusion of the wires 330 has been further reduced (not indicated) while the angle of the wires 330 is the same angle "$A_2$" and the wires 330 protrude from the gripper by the same distance "$L_1$" as in FIG. 3B. The push plate 340 can be moved in order to control the distance by which the wires 330 protrude from the gripper 300. This is illustrated in FIG. 3D, where the push plate 340 has been moved upward, retracting the wires 330 into the gripper 300.

Note that the example operations shown in FIGS. 3A-3D are intended as an example sequence that could be used according to an application and additional or alternative operations of a gripper as described herein are anticipated. The example operations shown in FIGS. 3A-3D could be used, e.g., to scoop an amount of material (e.g., a number of irregular objects composed of a foodstuff or other material) and then to dispense the material (e.g., after having moved the gripper from a region that contains a source of the material to a region where the material is needed).

Additionally, a gripper could include more or fewer irises than the two irises depicted in FIGS. 1 and 3A-D. For example, a gripper could include only a single iris. In such examples, the number of degrees of freedom of orientation and location of wires of the gripper that can be independently controlled may be reduced. For example, where only a single iris is included, rotation of the rotatable plate of the single iris could result in both a change in angle of the wires and a change in the radius at which the wires protrude from the gripper. In another example, a gripper could include a single iris and an additional static plate through openings of which the wires protrude from the gripper. Rotation of the rotatable plate of the single iris could result in a change in the angle of the wires while the radius at which the wires protrude from the gripper is maintained substantially constant by the location of the openings in the additional static plate.

Yet further, a gripper as described herein could lack a push plate. Such a gripper could operate to grip, dispense, or otherwise manipulate material without the ability to independently extend/retract wires of the gripper, e.g., by grasping/releasing the material by increasing/decreasing the angle of the wires and/or by increasing/decreasing the radius at which the wires protrude from the gripper. Omission of the push plate and/or including only a single iris could allow for a gripper that is lower-cost, that has fewer parts, that is easier to clean and/or service, or that is otherwise improved for applications in which the increased degrees of freedom of control provided by the push plate/additional iris are not needed and/or do not provide sufficient benefits.

One or more of the wires of a gripper described herein (e.g., 100, 300) could have a channel formed therein. Such a channel could be used to apply gas and/or liquid (e.g., water) to one or more apertures formed proximate the end of the wire(s). Such a gas and/or liquid could be applied, via the channel of the wire, to eject a material that has been penetrated by the wire and/or to eject a sheet of material, from a stack of such sheets that have been penetrated by the wire, from the wire (e.g., to dispense a slice of cheese or other material that is sticky, wet, or that is otherwise adherent to the wire and/or to other slices of the material that are penetrated by the wire). In some examples, such a channel could additionally or alternatively be used to detect whether the wire is penetrating an object (e.g., by applying a pressure to gas or liquid in the channel and detecting whether the applied pressure is able to escape via the channel or is contained by a material that is penetrated by the wire).

A gripper as described herein (e.g., 100, 300) could be disposed on the end of a robotic arm or other means for orienting and positioning the gripper within a space. The gripper could then be used to manipulate materials within the space, e.g., to collect foodstuffs and to manipulate the foodstuffs in order to assemble a sandwich, assemble a salad, assemble a pizza, or perform some other food preparation task or to manipulate some other irregular material(s). In such applications, computer vision could be used in order to determine whether the gripper is interacting with a material, to determine how much of the material is penetrated, held, or otherwise gripped by the gripper, or to determine some other information about the operation of the gripper and/or about materials in the environment of the gripper. Additionally or alternatively, the gripper could include one or more sensors configured to provide such information.

In some examples, a sensor could be coupled to one or more of the wires of the gripper. Such a sensor could include a force sensor configured to detect forces transmitted along the length of the wire, e.g., to detect how much force is being applied along a longitudinal direction of the wire, to determine whether the wire is penetrating at least one object, etc. Such a sensor could include one or more piezoelectric actuators configured to inject mechanical vibrations into the wire. The effects of these vibrations could then be detected (e.g., by the piezo actuators themselves, or by some additional components) and used to determine whether the wire is penetrating one or more objects, whether the wire is in contact with an object, a direction of such an object relative to an end of the wire, etc. In some examples, this could include the sensor having piezoelectric actuators configured to generate at least one of an axial vibration in the wire or a transverse vibration in the wire in one or more directions (e.g., two different transverse vibrations in the wire along orthogonal directions within the wire). Such vibration may additionally or alternatively be employed to dislodge or otherwise eject materials that have been penetrated or otherwise picked up by the wires.

A gripper as described herein (e.g., 100, 300) could be configured to facilitate cleaning and/or to comply with food safety standards or other standards of cleanliness. This could include the gripper being able to be disassembled wholly or partially such that the wires and/or other elements of the gripper (e.g., elements that come into contact with foodstuffs) may be removed and cleaned. Additionally or alternatively, the gripper may include disposable elements that may be removed and replaced after use in order to facilitate cleanliness. For example, the wires and/or tips thereof could be disposable. In some examples, the gripper could include a disposable drape that could be fitted over an end of the gripper that comes into contact with foodstuffs. In such examples, the wires could be configured to penetrate the drape, such that foodstuffs are prevented from entering the gripper.

III. Example Cleat-Type Grippers

In some embodiments, a gripper may be configured to control the a distance by which two or more sets of penetrating pins protrude from the gripper in order to penetrate, release, or otherwise manipulate foodstuffs or other materials of interest. The ability to control the extent to which such multiple sets of pins protrude from a gripper allows for foodstuffs or other irregular objects to be manipulated in a wide variety of ways, facilitating flexible strategies for the manipulation of the materials of interest. By penetrating the material with the pins, a variety of irregular objects can be gripped. Additionally or alternatively, a stacked arrangement of individual pieces of a material (e.g., stacked slices of cheese) can be stacked and subsequently individual slices of the stack can be dispensed by retracting the pins by specified amounts (e.g., by amounts corresponding to the thickness of the sheets of material).

Figure 4A:
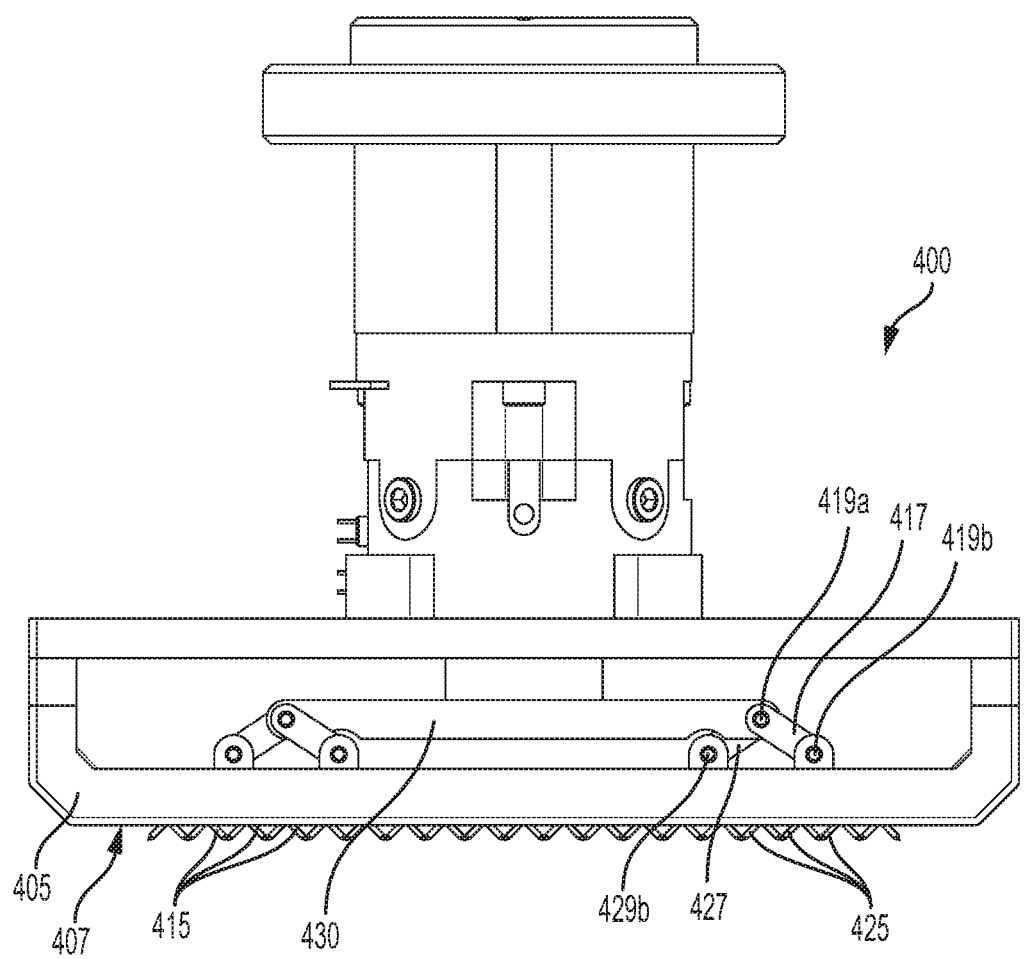
FIG. 4A is a perspective view of elements of an example gripper.

An example of such a gripper is illustrated in FIGS. 4A and 4B, which provide side and perspective views, respectively, of a gripper 400. The gripper 400 includes first 410 and second 420 push plates to which are coupled pins of respective first 415 and second 425 pluralities of pins. The pins of the first plurality of pins 415 are substantially parallel to each other and the pins of the second plurality of pins 425 are substantially parallel to each other. Pins of the first plurality of pins 415 are substantially non-parallel to pins of the second plurality of pins 425. The gripper 400 additionally includes a guide plate 405 having a contact surface 407 that may be placed in contact with foodstuffs or other material to be manipulated. A first plurality of channels and a second plurality of channels (illustrated by example in FIG. 5A as 512 and 514) extending from the contact surface 407 are formed through the guide plate 405 such that the first plurality of pins 415 can be disposed within the first plurality of channels and the second plurality of pins 425 can be disposed within the second plurality of channels.

A gripper (e.g., gripper 400) could be configured in a variety of ways to drive such multiple pluralities of pins into a material and then to retract the pins from the material by moving the pins through respective pluralities of channels in a guide plate. The gripper 400 includes an actuator (e.g., a pneumatic or hydraulic cylinder, a motor with a drive screw, an electromechanical linear actuator) that is operable to slidably move the first push plate 410 and the second push plate 420 relative to the guide plate 405 to result in the first plurality of pins 415 and the second plurality of pins 425 moving within respective pluralities of channels within the guide plate 405. The actuator is coupled to a drive member 430. The drive member 430 is coupled to the first push plate 410 via a first linking rod 417 that is mechanically coupled to the drive plate 430 via a first pin 419a and to the first push plate 410 via a second pin 419b. The drive member 430 is coupled to the second push plate 420 via a first linking rod 427 that is mechanically coupled to the drive plate 430 via the first pin 419a and to the second push plate 420 via a third pin 429b. Additionally or alternatively, the first linking rod 427 could be mechanically coupled to the drive plate 430 via a different pin than the first pin 419a.

A gripper as described herein (e.g., gripper 400) could be operated to penetrate and grip a stacked arrangement of items (e.g., a stack of sheets or slices of cheese, tomato, or some other foodstuff or other material of interest) using the two or more pluralities of pins and subsequently to dispense some (e.g., one or more individual items from the stack) or all of the stack by fully or partially retracting the pins. This is illustrated by way of example in FIGS. 5A-D which show, in cross-section, a gripper 500 at a number of different points in time as the gripper 500 is operated to pick up and the dispense items from a stack of items 550 (e.g., a stack of slices of cheese).

Figure 5A:
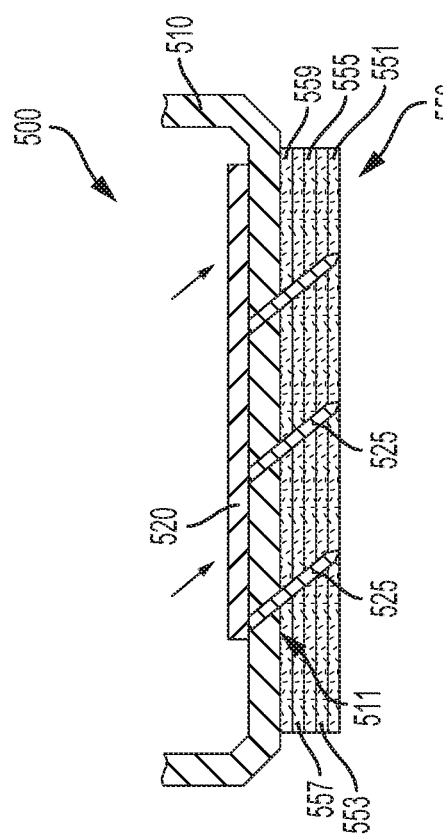
FIG. 5A is a cross-sectional view of elements of an example gripper.

FIG. 5A shows the gripper 500 prior to picking up the stack 550. The gripper 500 includes a guide plate 510 that has a contact surface 511. The gripper 500 additionally includes a first push plate 520 that is coupled to a first plurality of pins 525. Each pin of the first plurality of pins 525 is disposed within a respective channel of a first plurality of channels 512 that is formed through the guide plate 510 from the contact surface 511. The gripper 500 also includes a second push plate 530 that is coupled to a second plurality of pins 535. Each pin of the second plurality of pins 535 is disposed within a respective channel of a second plurality of channels 514 that is formed through the guide plate 510 from the contact surface 511. As shown in FIG. 5A, the first 525 and second 535 pluralities of pins are fully retracted into the guide plate 510.

Figure 5B:
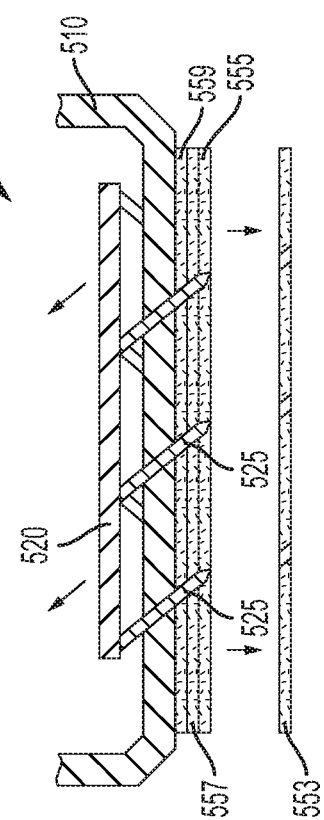
FIG. 5B is a cross-sectional view of elements of the example gripper of FIG. 5A.

At a second time point, illustrated in FIG. 5B, the gripper 500 has been positioned proximate to (e.g., in contact with) a plurality of items 551, 553, 555, 557, 559 arranged in a stacked arrangement (as stack 550) and the first 510 and second 520 push plates have been actuated such that the first 525 and second 535 pluralities of pins have protruded from the contact surface 511 to penetrate all of the items 551, 553, 555, 557, 559 of the stack.

Figure 5C:
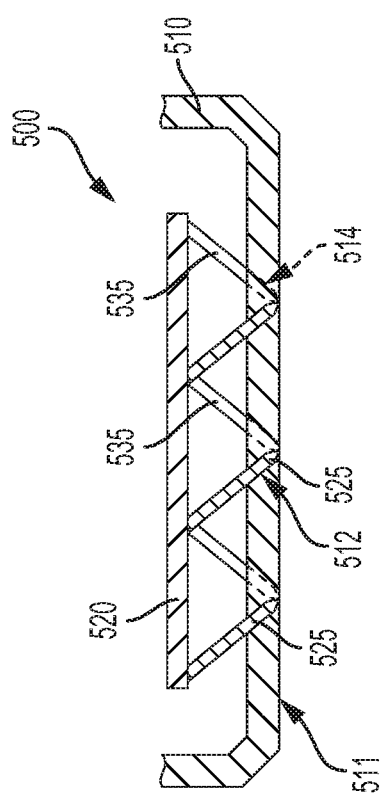
FIG. 5C is a cross-sectional view of elements of the example gripper of FIG. 5B.
Figure 5D:
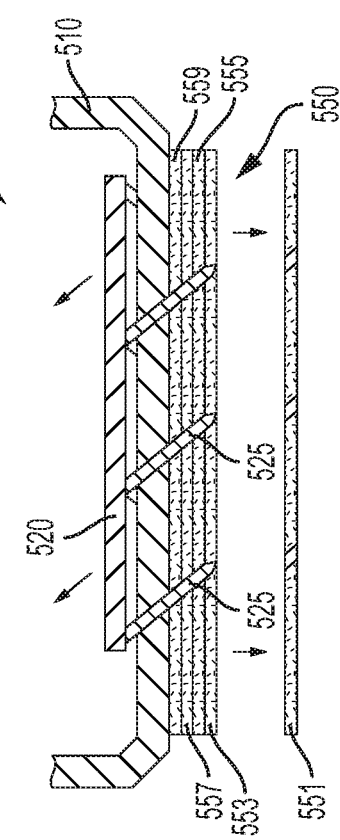
FIG. 5D is a cross-sectional view of elements of the example gripper of FIG. 5C.

The gripper can then be used to dispense some or all of the stack at another location (e.g., by using a robot arm or other means to control the position and/or orientation of the gripper 500). This is illustrated in FIG. 5C, which shows the gripper 500 at a third time point. At the third time point, the first 510 and second 520 push plates have been actuated such that the first 525 and second 535 pluralities of pins have been partially retracted into the guide plate 510, dispensing a first item 551 from the stack. The gripper 500 could be operated to dispense additional items, e.g., at further locations. This is illustrated in FIG. 5D, which shows the gripper 500 at a fourth time point. At the fourth time point, the first 510 and second 520 push plates have been actuated such that the first 525 and second 535 pluralities of pins have been further retracted into the guide plate 510, dispensing a second item 553 from the stack.

A gripper as described herein (e.g., 400, 500) could be disposed on the end of a robotic arm or other means for orienting and positioning the gripper within a space. The gripper could then be used to manipulate materials within the space, e.g., to collect foodstuffs and to manipulate the foodstuffs in order to assemble a sandwich, assemble a salad, assemble a pizza, or perform some other food preparation task or to manipulate some other material(s). In such applications, computer vision could be used in order to determine whether the gripper is interacting with a material, to determine how much of the material is penetrated, held, or otherwise gripped by the gripper, or to determine some other information about the operation of the gripper and/or about materials in the environment of the gripper. Additionally or alternatively, the gripper could include one or more sensors configured to provide such information.

In some examples, a sensor could be coupled to one or more of the pins of the gripper (e.g., to a push plate to which such pins are coupled). Such a sensor could include a force sensor configured to detect forces transmitted along the length of the pin(s), e.g., to detect how much force is being applied along a longitudinal direction of the pins(s), to determine whether the pin(s) are penetrating at least one object, etc. The gripper could be operated based on the output of such a sensor, e.g., to detect how many objects are penetrated by the gripper or to detect that an item from a stack has been dispensed and to responsively cease retracting the pins.

In some applications, the items in a stack of items to be dispensed may have a tendency to stick together (e.g., due to a stickiness of the material, due to capillary forces, due to adhesion, due to other attractive forces between the items in a stack). In such applications, simply retracting the pins of a gripper that has penetrated the stack may not result in dispensation of one or more items from the stack, or may result in dispensation of a random or otherwise uncontrolled number of items from the stack. For such applications, a gripper as described herein (e.g., 400, 500) could include one or more a channels formed within respective pins of the gripper. Such a channel could be used to apply gas and/or liquid (e.g., water) via one or more apertures to separate an item (e.g., a slice of cheese) from a stack of such items that have been penetrated by the wire in order to dispense the item. In some examples, such a channel could additionally or alternatively be used to detect whether the pin is penetrating an item (e.g., by applying a pressure to gas or liquid in the channel and detecting whether the applied pressure is able to escape via the channel or is contained by a material that is penetrated by the wire) and/or whether an item has been successfully dispensed (e.g., by detecting a reduction in pressure within the channel and/or an increase in gas or liquid flow through the channel following dispensation of an item).

Figure 6A:
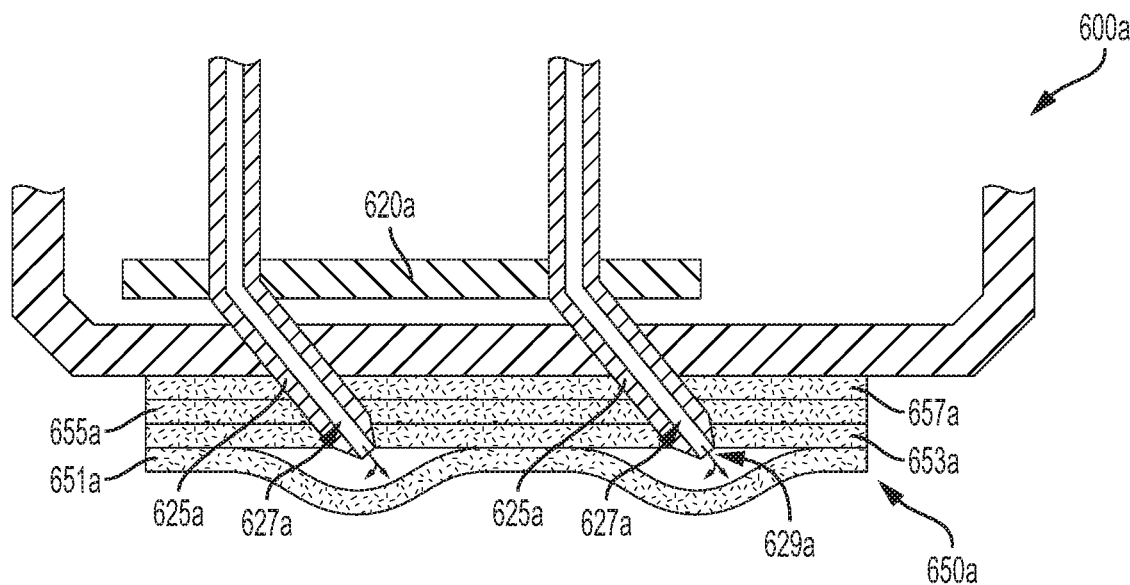
FIG. 6A is a cross-sectional view of elements of an example gripper.

An example of a gripper that includes such channels is shown in FIG. 6A. FIG. 6A includes a gripper 600*a* that has gripped a stack 650*a* of items 651*a*, 653*a*, 655*a*, 657*a*. The gripper 600*a* includes a first push plate 620*a* coupled to a first plurality of pins 625*a* and a second push plate (not shown) coupled to a second plurality of pins (not shown). Channels 627*a* are formed in pins of the first plurality of pins 625*a*. The channels 627*a* terminate in apertures 629*a* formed at the end of respective pins 625*a*. The pins 625*a* are positioned relative to the stack 650*a* such that gas or liquid (e.g., water, oil) that is applied through the channels 627*a* can act to separate a first item 651*a* from the remainder of the stack 650*a*. The gas or liquid could be applied as the pins 625*a* are retracted, facilitating dispensation of items of the stack 650*a*.

While FIG. 6A shows the channels of gripper 600*a* terminated in single apertures at the end of respective pins, other arrangements are possible. For example, the channels could terminate in multiple apertures (e.g., to permit multiple sheets, slices, or other items in a stack to be separated from each other at a time) and/or could terminate in apertures formed through a lateral surface of respective pins (e.g., to permit a sheet, slice, or other item to be separated from the remainder of the stack while still being penetrated by pins of the gripper).

Figure 6B:
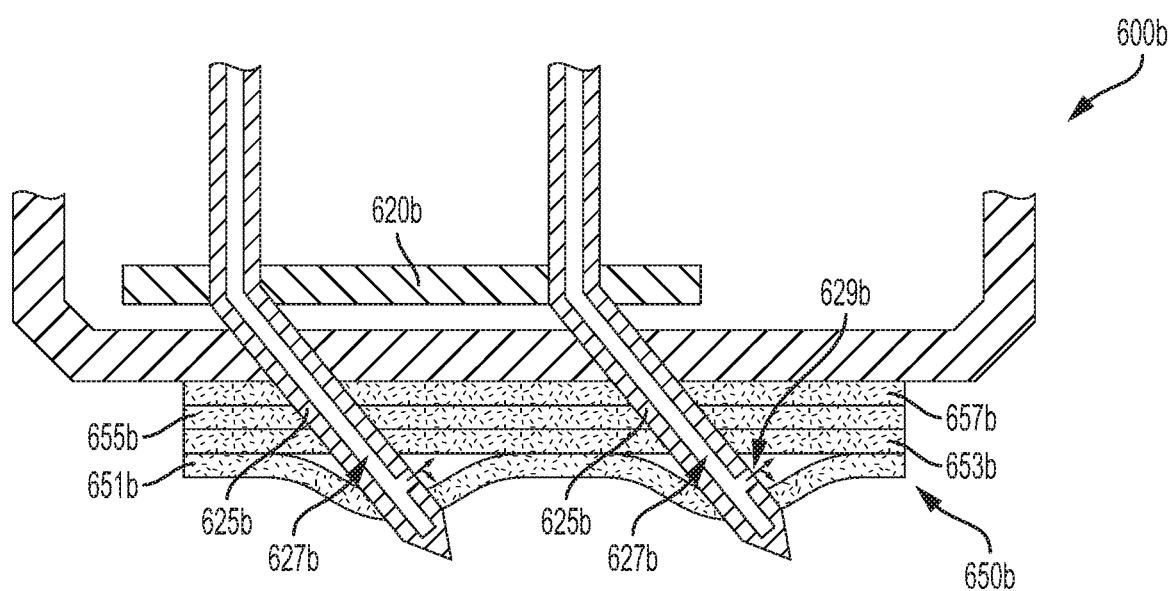
FIG. 6B is a cross-sectional view of elements of an example gripper.

An example of a gripper that includes such channels is shown in FIG. 6B. FIG. 6B includes a gripper 600*b* that has gripped a stack 650*b* of items 651*b*, 653*b*, 655*b*, 657*b*. The gripper 600*b* includes a first push plate 620*b* coupled to a first plurality of pins 625*b* and a second push plate (not shown) coupled to a second plurality of pins (not shown). Channels 627*b* are formed in pins of the first plurality of pins 625*b*. The channels 627*b* terminate in apertures 629*b* formed through a lateral surface of respective pins 625*b*. The pins 625*b* are positioned relative to the stack 650*b* such that gas or liquid (e.g., water, oil) that is applied through the channels 627*b* can act to separate a first item 651*b* from the remainder of the stack 650*b* while still being penetrated by the pins 625*b*. The gas or liquid could be applied as the pins 625*b* are retracted, facilitating dispensation of items of the stack 650*b*. A gripper as described herein may include multiple sets of pins configured as illustrated in FIGS. 6A and 6B, respective, or according to some other configuration of aperture(s).

A gripper as described herein (e.g., 400, 500, 600*a*, 600*b*) could be configured to facilitate cleaning and/or to comply with food safety standards or other standards of cleanliness. This could include the gripper being able to be disassembled wholly or partially such that the guide plate, contact surface, push plates, pins, and/or other elements of the gripper (e.g., elements that come into contact with foodstuffs) may be removed and cleaned. For example, a gripper could include a housing to which a guide plate, push plate with pins coupled thereto, or other elements are removably mounted (e.g., via latches, bolts, clips, snaps, or other features or elements). Additionally or alternatively, the gripper may include disposable elements that may be removed and replaced after use in order to facilitate cleanliness. For example, the guide plate and/or push plate and pins coupled thereto could be disposable. In some examples, the gripper could be cleaned by applying a cleaning fluid (e.g., detergent, bleach, sterilizing fluid) through the channels of the guide plate and/or through channels formed in the pins.

IV. Example Methods

Figure 7:
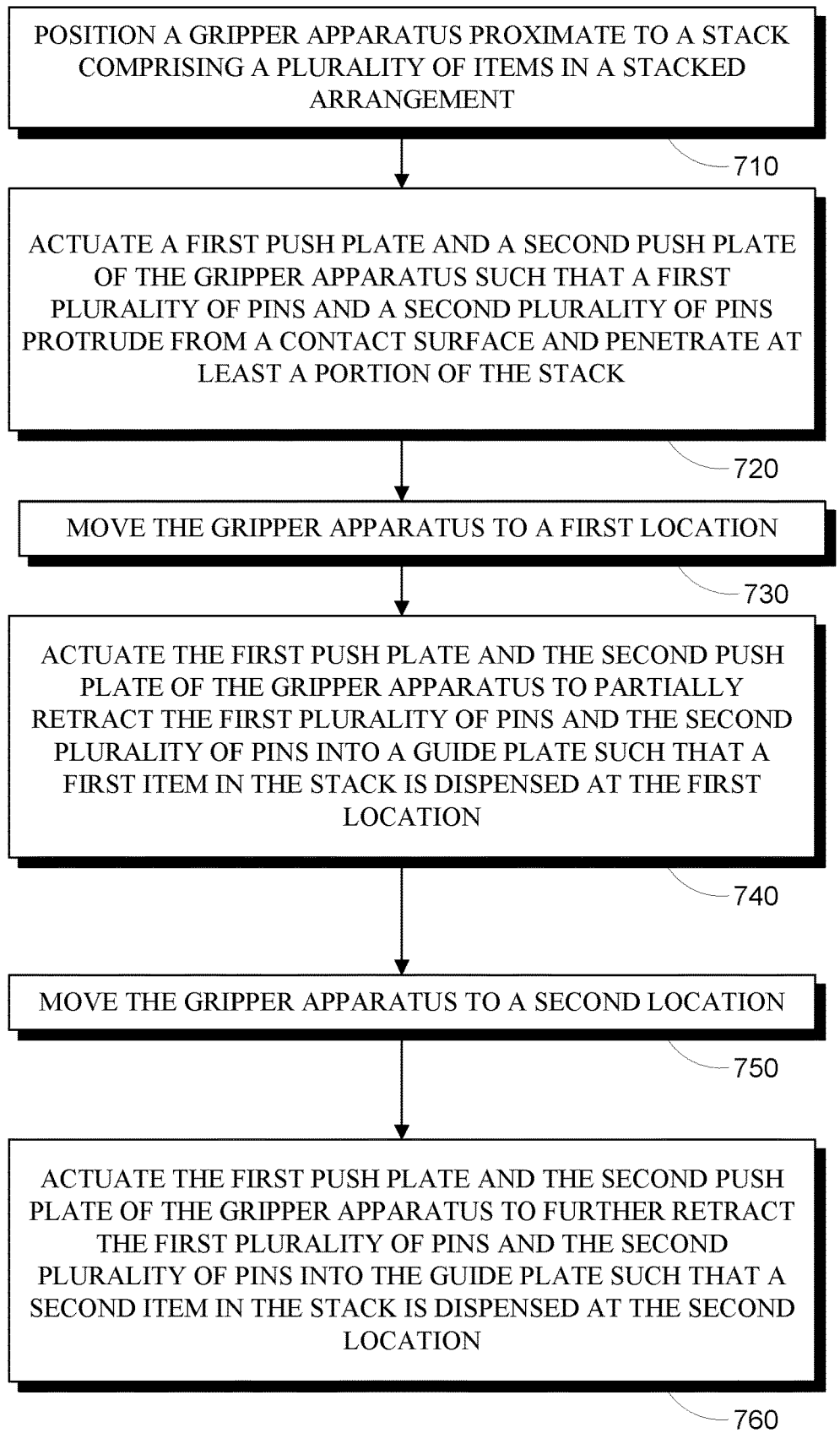
FIG. 7 is a flowchart of an example method.

FIG. 7 is a flowchart of a method 700 for slices of material (e.g., slices of cheese, meat, tomato, or some other sliced foodstuff) from a stack of slices of the material (e.g., to construct a sandwich or to perform some other food processing or preparation task). The method 700 includes positioning a gripper apparatus proximate to a stack that includes a plurality of items in a stacked arrangement (710). The gripper apparatus includes: (i) a first push plate, wherein a first plurality of pins are coupled to the first push plate, and wherein the pins of the plurality of first pins are substantially parallel to each other; (ii) a second push plate, wherein a second plurality of pins are coupled to the second push plate, wherein the pins of the plurality of second pins are substantially parallel to each other, and wherein pins of the first plurality of pins are substantially non-parallel to pins of the second plurality of pins; and (iii) a guide plate having a contact surface and having formed therein a first plurality of channels extending from the contact surface and a second plurality of channels extending from the contact surface. The first push plate is disposed relative to the guide plate such that the pins of the first plurality of pins are disposed within respective channels of the first plurality of channels; the second push plate is disposed relative to the guide plate such that the pins of the second plurality of pins are disposed within respective channels of the second plurality of channels; and the first push plate and the second push plate are slidably movable relative to the guide plate such that the first push plate and the second push plate can be moved relative to the guide plate to result in the first plurality of pins and second plurality of pins, respectively, protruding from the contact surface.

The method 700 additionally includes actuating the first push plate and the second push plate of the gripper apparatus such that the first plurality of pins and the second plurality of pins protrude from the contact surface and penetrate at least a portion of the stack (720); moving the gripper apparatus to a first location (730); actuating the first push plate and the second push plate of the gripper apparatus to partially retract the first plurality of pins and the second plurality of pins into the guide plate such that a first item in the stack is dispensed at the first location (740); moving the gripper apparatus to a second location (750); and actuating the first push plate and the second push plate of the gripper apparatus to further retract the first plurality of pins and the second plurality of pins into the guide plate such that a second item in the stack is dispensed at the second location (760). In some examples, the first and second location could be the same location, e.g., such that multiple items (e.g., the first and second items) may be dispensed at the same location. The method 700 could include additional elements or features.

V. Conclusion

The particular arrangements shown in the Figures should not be viewed as limiting. It should be understood that other embodiments may include more or fewer/less of each element shown in a given Figure. Further, some of the illustrated elements may be combined or omitted. Yet further, an exemplary embodiment may include elements that are not illustrated in the Figures.

Additionally, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

What is claimed is:

1. A gripper apparatus comprising:
   a first iris, wherein the first iris comprises: (i) a first static plate having a first plurality of openings therein, and (ii) a first rotatable plate having a second plurality of openings therein, wherein the first rotatable plate has a first axis of rotation, and wherein the first rotatable plate is rotatable, relative to the first static plate, about the first axis of rotation;
   a second static plate having a third plurality of openings therein;
   a push plate that is slidably movable relative to first iris and the second static plate, wherein the first static plate and the first rotatable plate are disposed between the push plate and the second static plate; and
   a plurality of flexible wires, wherein each respective wire of the plurality of flexible wires is disposed within a respective opening of the first plurality of openings, a respective opening of the second plurality of openings, and a respective opening of the third plurality of openings such that rotation of the first rotatable plate relative to the first static plate results in a change in a distance between the respective wire and the first axis of rotation of the first rotatable plate, and wherein each wire of the plurality of flexible wires is mechanically coupled to the push plate such that motion of the push plate, relative to the first iris and the second static plate, results in longitudinal motion of the plurality of wires through the first, second, and third pluralities of openings.

2. The apparatus of claim 1, wherein the first plurality of openings comprises a plurality of linear slots, and wherein the second plurality of openings comprises a plurality of spiral slots.

3. The apparatus of claim 1, further comprising:
   a second iris, wherein the second iris comprises: (i) the second static plate, and (ii) a second rotatable plate having a fourth plurality of openings therein, wherein the second rotatable plate has a second axis of rotation, wherein the second rotatable plate is rotatable, relative to the second static plate, about the second axis of rotation, and wherein each respective wire of the plurality of flexible wires is disposed within a respective opening of the fourth plurality of openings such that rotation of the second rotatable plate relative to the second static plate results in a change in a distance between the respective wire and the second axis of rotation of the second rotatable plate.

4. The apparatus of claim 3, further comprising:
   a tube, wherein the tube is coupled to the first rotatable plate, and wherein the tube has a channel along a rotational axis of the tube; and
   a rod, wherein the rod is coupled to the second rotatable plate, and wherein the rod is disposed within the channel of the tube.

5. The apparatus of claim 1, further comprising a plurality of pointed tips,
   wherein each respective wire of the plurality of flexible wires is coupled to a respective pointed tip of the plurality of pointed tips.

6. The apparatus of claim 1, further comprising:
   at least one sensor mechanically coupled to at least one wire of the plurality of flexible wires, wherein the at least one sensor is operable to detect at least one of whether at least one wire is penetrating an object or a force applied along a longitudinal direction of the at least one wire.

7. The apparatus of claim 6, wherein the at least one sensor comprises a plurality of piezoelectric actuators coupled to the at least one wire, wherein each piezoelectric actuator is operable to generate at least one of an axial vibration in the at least one wire or a transverse vibration in the at least one wire.

8. The apparatus of claim 1, wherein at least one wire of the plurality of wires has a channel formed therein.

9. A method for gripping individual items in a stack of items, the method comprising:
   positioning a gripper apparatus proximate to a stack comprising a plurality of items in a stacked arrangement, and wherein the gripper apparatus comprises:
   a first push plate, wherein a first plurality of pins are coupled to the first push plate, and wherein the pins of the plurality of first pins are substantially parallel to each other;
   a second push plate, wherein a second plurality of pins are coupled to the second push plate, wherein the pins of the plurality of second pins are substantially parallel to each other, and wherein pins of the first plurality of pins are substantially non-parallel to pins of the second plurality of pins; and
   a guide plate having a contact surface, wherein the guide plate has formed therein a first plurality of channels extending from the contact surface and a second plurality of channels extending from the contact surface, wherein the first push plate is disposed relative to the guide plate such that the pins of the first plurality of pins are disposed within respective channels of the first plurality of channels, wherein the second push plate is disposed relative to the guide plate such that the pins of the second plurality of pins are disposed within respective channels of the second plurality of channels, and wherein the first push plate and the second push plate are slidably movable relative to the guide plate such that the first push plate and the second push plate can be moved relative to the guide plate to result in the first plurality of pins and second plurality of pins, respectively, protruding from the contact surface;

actuating the first push plate and the second push plate of the gripper apparatus such that the first plurality of pins and the second plurality of pins protrude from the contact surface and penetrate at least a portion of the stack;

moving the gripper apparatus to a first location;

actuating the first push plate and the second push plate of the gripper apparatus to partially retract the first plurality of pins and the second plurality of pins into the guide plate such that a first item in the stack is dispensed at the first location;

moving the gripper apparatus to a second location; and actuating the first push plate and the second push plate of the gripper apparatus to further retract the first plurality of pins and the second plurality of pins into the guide plate such that a second item in the stack is dispensed at the second location.

10. The method of claim 9, wherein the gripper apparatus further comprises a sensor that is coupled to at least one pin of the first plurality of pins, and wherein the method further comprises:

while actuating the first plate and the second plate of the gripper apparatus such that the first plurality of pins and the second plurality of pins protrude from the contact surface and penetrate at least a portion of the stack, operating the sensor to detect how many items are present in the stack.

11. The method of claim 9, wherein the gripper apparatus further comprises a sensor that is coupled to at least one pin of the first plurality of pins, and wherein the method further comprises:

while actuating the first push plate and the second push plate of the gripper apparatus to partially retract the first plurality of pins and the second plurality of pins into the guide plate such that a first item in the stack is dispensed at the first location, operating the sensor to detect whether the first item has been dispensed, wherein actuating the first push plate and the second push plate of the gripper apparatus to partially retract the first plurality of pins and the second plurality of pins into the guide plate such that an item is dispensed at the first location comprises actuating the first push plate and the second push plate to partially retract the first plurality of pins and the second plurality of pins into the guide plate until the sensor detects that the first item has been dispensed.

12. The method of claim 9, wherein at least one pin of the first plurality of pins has formed therein a channel that terminates in at least one aperture formed proximate an end of the at least one pin, and wherein the method further comprises:

applying a gas or liquid, via the channel of the at least one pin, to separate the first item from the second item.

13. The method of claim 12, wherein the gas or liquid is applied while actuating the first push plate and the second push plate of the gripper apparatus to partially retract the first plurality of pins and the second plurality of pins into the guide plate such that the first item in the stack is dispensed at the first location.

14. The method of claim 12, further comprising:

cleaning the gripper apparatus, wherein cleaning the gripper apparatus comprises applying a cleaning fluid via the channel of the at least one pin.

15. A gripper apparatus comprising:

a first push plate, wherein a first plurality of pins are coupled to the first push plate, and wherein the pins of the plurality of first pins are substantially parallel to each other;

a second push plate, wherein a second plurality of pins are coupled to the second push plate, wherein the pins of the plurality of second pins are substantially parallel to each other, and wherein pins of the first plurality of pins are substantially non-parallel to pins of the second plurality of pins; and a guide plate having a contact surface, wherein the guide plate has formed therein a first plurality of channels extending from the contact surface and a second plurality of channels extending from the contact surface, wherein the first push plate is disposed relative to the guide plate such that the pins of the first plurality of pins are disposed within respective channels of the first plurality of channels, wherein the second push plate is disposed relative to the guide plate such that the pins of the second plurality of pins are disposed within respective channels of the second plurality of channels, and wherein the first push plate and the second push plate are slidably movable relative to the guide plate such that the first push plate and the second push plate can be moved relative to the guide plate to result in the first plurality of pins and second plurality of pins, respectively, protruding from the contact surface.

16. The apparatus of claim 15, further comprising:

a housing, wherein the guide plate is removably mounted to the housing such that the guide plate can be removed from the housing when the first plurality of pins and the second plurality of pins are fully retracted from the guide plate.

17. The apparatus of claim 15, further comprising at least one sensor that is coupled to at least one pin of the first plurality of pins, wherein the at least one sensor is operable to detect a force applied along a longitudinal direction of the at least one pin.

18. The apparatus of claim 15, wherein at least one pin of the first plurality of pins has formed therein a channel that terminates in an aperture formed at the end of the first pin.

19. The apparatus of claim 15, wherein at least one pin of the first plurality of pins has formed therein a channel that terminates in an aperture formed through a lateral surface of the first pin.

20. The apparatus of claim 15, further comprising an actuator, wherein the actuator is operable to slidably move the first push plate and the second push plate relative to the guide plate to result in the first plurality of pins and second plurality of pins, respectively, moving within respective sets of channels within the guide plate.

21. The apparatus of claim 20, further comprising:

a first linking rod, wherein the first linking rod is mechanically coupled to the actuator via a first pin, and wherein the first linking rod is mechanically coupled to the first push plate via a second pin; and a second linking rod, wherein the second first linking rod is mechanically coupled to the actuator via a third pin, and wherein the second linking rod is mechanically coupled to the second push plate via a fourth pin.

* * * * *